June 2, 1970  B. BLISS  3,515,304
CAKE HOLDER AND CANISTER SET ASSEMBLY
Filed July 10, 1968  2 Sheets-Sheet 1

INVENTOR
BEATRICE BLISS
BY
ATTORNEY

June 2, 1970  B. BLISS  3,515,304
CAKE HOLDER AND CANISTER SET ASSEMBLY
Filed July 10, 1968  2 Sheets-Sheet 2

INVENTOR
BEATRICE BLISS
BY
ATTORNEY

United States Patent Office 3,515,304
Patented June 2, 1970

3,515,304
CAKE HOLDER AND CANISTER SET ASSEMBLY
Beatrice Bliss, Los Angeles, Calif.
(13007 S. Western Ave., Gardena, Calif. 90249)
Filed July 10, 1968, Ser. No. 743,825
Int. Cl. A47g 19/30, 23/08
U.S. Cl. 220—23.86      8 Claims

ABSTRACT OF THE DISCLOSURE

A coupling mounts a cake holder on a canister set in a manner whereby the rotatable tray of the canister set supports the cake holder.

---

The present invention relates to a combination cake holder and canister set.

In a small kitchen or in crowded or cramped living quarters, space is at a premium. It is often extremely difficult to find sufficient surface space for both a canister set and a cake holder. The modern trend toward greater utilization of space and greater compactness makes it practically impossible to keep a canister set and a cake holder, simultaneously. Many apartment dwellers and even house dwellers have had to forego owning the other once they have acquired either a canister set or a cake holder. This is an unfortunate situation, since each of these items has considerable utility.

The principal object of the present invention is to provide a combination cake holder and canister set.

An object of the present invention is to provide a combination cake holder and canister set which utilizes a minimum surface space.

An object of the present invention is to provide a combination cake holder and canister set which utilizes only the amount of surface space which the canister set would utilize.

An object of the present invention is to provide a combination cake holder and canister set which combines all the advantages of a canister set with all the advantages of a cake holder without detracting from either.

An object of the present invention is to provide combination cake holder and canister set which is sturdy in structure, reliable in operation, compact and economical in manufacture.

In accordance with the present invention, a combination cake holder and canister set comprises a canister set comprising a plurality of canisters disposed on a rotatable tray and a cake holder comprising a cake tray and a cake cover resting on the cake tray. A coupling mounts the cake holder on the canister set in a manner whereby the rotatable tray of the canister set supports the cake holder.

The coupling comprises a support member axially positioned on the rotatable tray and coaxially supporting the cake tray of the cake holder. The support member having a plurality of radially extending panels equiangularly spaced from each other and separating the canisters of the canister set from each other.

The rotatable tray of the canister set has an axial aperture formed therethrough. The cake tray of the cake holder has an axial aperture formed therethrough. The coupling comprises a support member having an axially extending rod and a plurality of panels radially extending from the rod and equiangularly spaced from each other and separating the canisters of the canister set from each other. The rod extends through the aperture of the rotatable tray at one end and through the aperture of the cake tray at its other end. A plurality of brackets are mounted on the underside of the cake tray in a manner whereby the upper free corner of each of the panels of the support member of the coupling is housed in a corresponding one of the brackets. Each of the brackets is of U-shaped configuration opening toward the axial aperture.

The canister set may comprise a set of canisters, each canister having a container portion of substantially triangular horizontal cross-section and a handle portion of substantially arcuate horizontal cross-section, the canisters being disposed on a rotatable tray.

In order that the present invention may be readily carried into effect, it will now be described with reference to the accompanying drawings, wherein.

In the figures, the same components are identified by the same reference numerals.

The combination cake holder and canister set of the present invention comprises a canister set 11 and a cake holder 12. The canister set 11 may comprise any suitable canister set such as, for example, that described in U.S. Pat. No. 3,385,465, issued May 28, 1968, and entitled "Canister Set."

Figure 3:
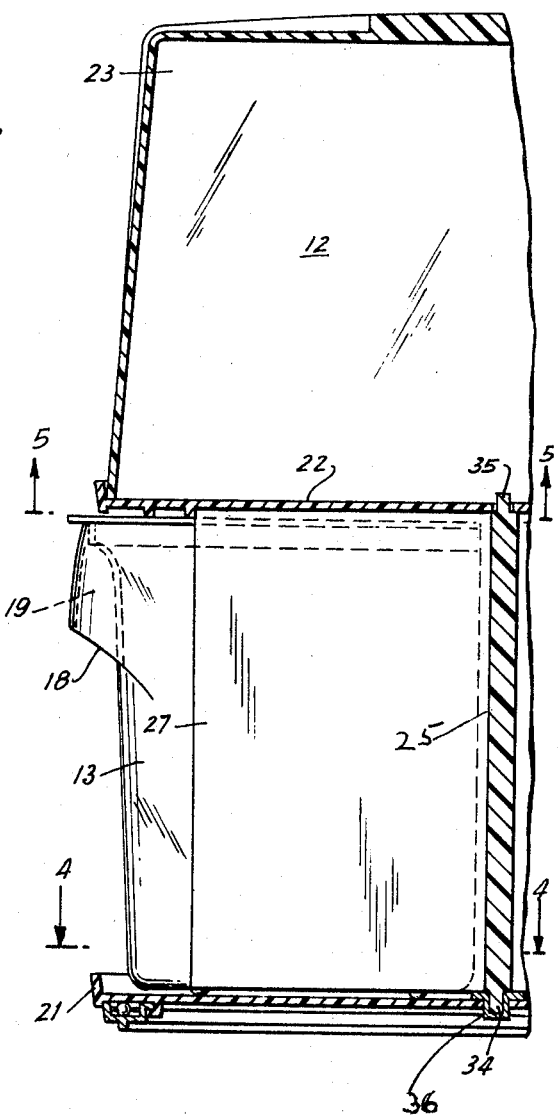
FIG. 3 is an axial sectional view, taken along the lines 3—3 of FIG. 1.
Figure 2:
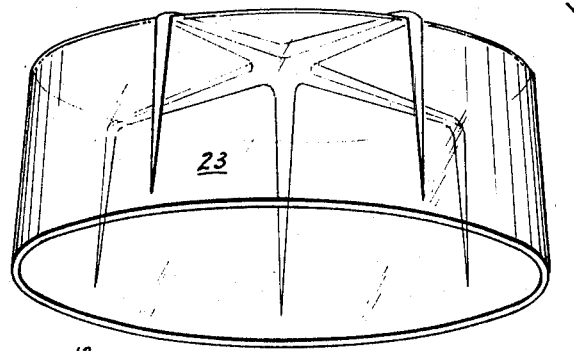
FIG. 2 is a blow up, in perspective, of the embodiment of FIG. 1.
Figure 2:
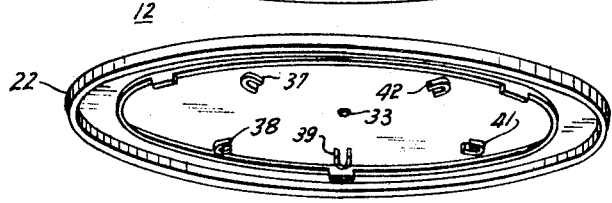
Figure 2:
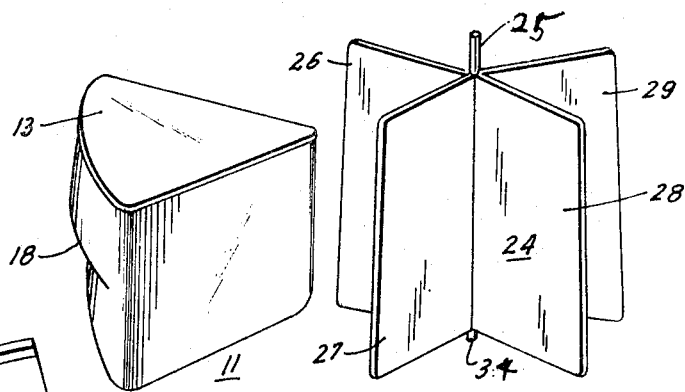
Figure 4:
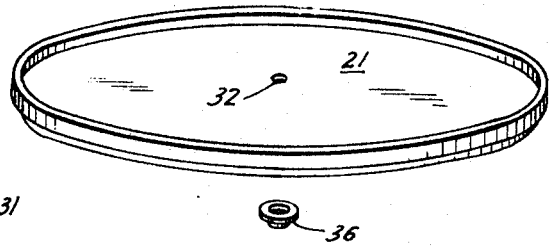
FIG. 4 is a view, taken along the lines 4—4 of FIG. 3.
Figure 4:
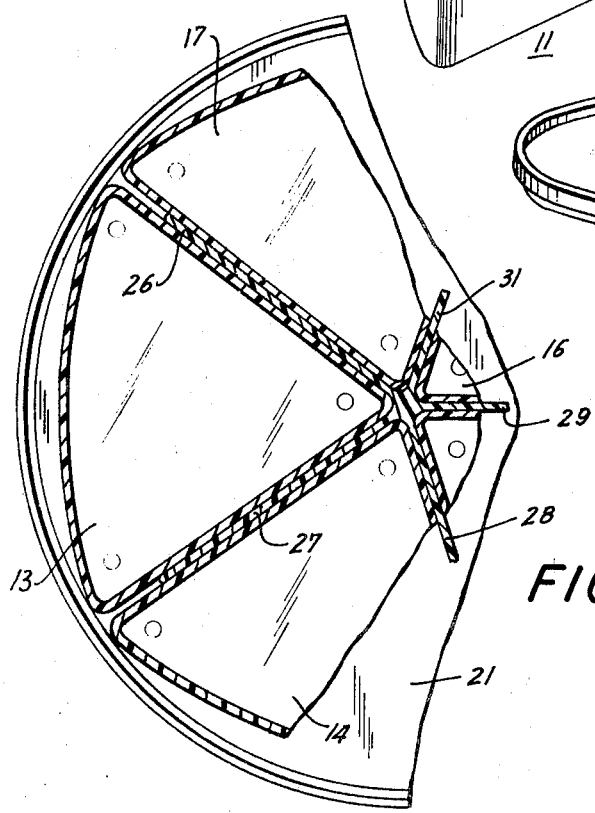

The canister set described in the aforementioned patent comprises a set of canisters 13, 14, 15, 16 and 17 (FIG. 4). Each canister has a container portion of substantially triangular horizontal cross-section (FIGS. 2 and 4). An assembly of the set of canisters 13, 14, 15, 16 and 17 has a horizontal cross-section through the container portions of a regular polygon (FIG. 4) and a horizontal cross-section through the handle portions of a circle having substantially the same diameter as the polygon. A handle portion 18 of the canister 13 is shown in FIGS. 2 and 3. Each handle portion includes an upwardly directed digit receiving recess, as shown in FIG. 3, which illustrates the digit receiving recess 19 of the canister 13. The canisters are disposed on a rotatable tray 21 which has substantially the same diameter as the polygon.

Figure 1:
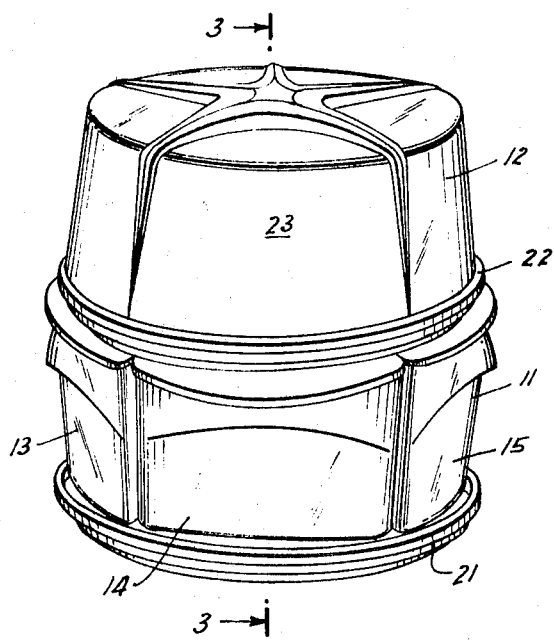
FIG. 1 is a perspective view of an embodiment of the combination cake holder and canister set of the present invention.

The cake holder 12 may comprise any suitable cake holder such as, for example, a cake tray 22 of known type (FIGS. 1, 2, 3 and 5) and a cake cover 23 of known type resting on said cake tray (FIGS. 1, 2 and 3).

Figure 5:
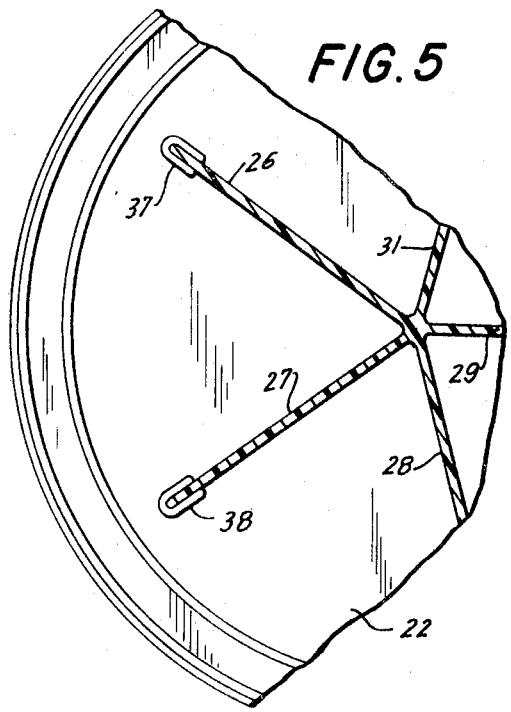
FIG. 5 is a view, taken along the lines 5—5 of FIG. 3.

In accordance with the present invention, a coupling 24 (FIG. 2) mounts the cake holder 12 on the canister set 11 in a manner whereby the rotatable tray 21 of said canister set supports said cake holder. The coupling 24 comprises a support member having an axially extending rod 25 (FIG. 2) and a plurality of panels 26, 27, 28, 29 and 31 radially extending from said rod (FIGS. 2, 4 and 5). The panel 31 is not seen in the view of FIG. 2, since in such view it is obstructed by the rod 25. The panels 26, 27, 28, 29 and 31 are equiangularly spaced from each other and separate the canisters 13, 14, 15, 16 and 17 from each other (FIG. 4). Each of the panels has the same dimensions as the others.

The rotatable tray 21 has an axial aperture 32 (FIG. 2) formed therethrough. The cake tray 22 has an axial aperture 33 (FIG. 2) formed therethrough. The rod 25 extends through the aperture 32 of the rotatable tray 21 at one end 34 and through the aperture 33 of the cake tray 22 at its other end 35 (FIGS. 2 and 3). The end 34 of the rod 25 may be affixed to the rotatable tray 21 by any suitable fastening means such as, for example, a cap 36 (FIG. 2) which may be clamped onto said end under pressure.

A plurality of brackets 37, 38, 39, 41 and 42 (FIGS. 2 and 5) are mounted on the underside of the cake tray 22 in correspondence with the panels 26, 27, 28, 29 and 31, so that each of said brackets corresponds in position with a corresponding one of each of said panels. Thus, the upper free corner of each of the panels 26, 27, 28, 29 and 31 of the support member of the coupling 24 is housed in a corresponding one of the brackets 37, 38, 39, 41 and 42. Thus, the upper free corner of the panel 26 fits into and is housed in the bracket 37, the upper free corner of the panel 27 fits into and is housed in the bracket 38, the upper free corner of the panel 28 fits into and is housed in the bracket 39, the upper free corner of the panel 29 fits into and is housed in the bracket 41, and the upper free corner of the panel 31 fits into and is housed in the bracket 42.

Each of the brackets 37, 38, 39, 41 and 42 is of U-shaped configuration opening toward the axial aperture 33, as shown in FIGS. 2 and 5. Any suitable type of brackets or guides may be utilized, of course.

While the invention has been described by means of a specific example and in a specific embodiment, I do not wish to be limited thereto, for obvious modifications will occur to those skilled in the art without departing from the spirit and scope of the invention.

What I claim is:

1. A combination cake holder and canister set, comprising a canister set comprising a plurality of canisters disposed on a rotatable tray; said tray having an upper surface and an upstanding rim; a cake holder comprising a cake tray and a cake cover resting on said cake tray; being removably supported directly by said tray and said cover comprising a peripheral side wall terminating in a lower free edge which engages the upper surface of said tray inwardly of rim and coupling means for mounting said cake holder on said canister set in a manner whereby the rotatable tray of said canister set supports said cake holder.

2. A combination cake holder and canister set as claimed in claim 1, wherein said coupling means comprises a support member axially positioned on said rotatable tray and coaxially supporting the cake tray of said cake holder.

3. A combination cake holder and canister set as claimed in claim 1, wherein said coupling means comprises a support member having a plurality of radially extending panels equiangularly spaced from each other and separating the canisters of said canister set from each other.

4. A combination cake holder and canister set as claimed in claim 1, wherein the rotatable tray of said canister set has an axial aperture formed therethrough, the cake tray of said cake holder has an axial aperture formed therethrough and said coupling means comprises a support member having an axially extending rod and a plurality of panels radially extending from said rod and equiangularly spaced from each other and separating the canisters of said canister set from each other, said rod extending through the aperture of said rotatable tray at one end and through the aperture of said cake tray at its other end.

5. A combination cake holder and canister set as claimed in claim 1, wherein said canister set comprises a set of canisters, each canister having a container portion of substantially triangular horizontal cross-section and a handle portion of substantially arcuate horizontal cross section, said canisters being disposed on a rotatable tray.

6. A combination cake holder and canister set as claimed in claim 4, further comprising a plurality of brackets mounted on the underside of said cake tray in a manner whereby the upper free corner of each of the panels of the support member of said coupling means is housed in a corresponding one of said brackets.

7. A combination cake holder and canister set as claimed in claim 6, wherein each of said brackets is of U-shaped configuration opening toward said axial aperture.

8. A combination cake holder and canister set as claimed in claim 7, wherein said canister set comprises a set of canisters, each canister having a container portion of substantially triangular horizontal cross-section and a handle portion of substantially arcuate horizontal cross-section, said canisters being disposed on a rotatable tray.

References Cited

UNITED STATES PATENTS

| 82,035 | 9/1868 | Rich | 312—285 |
|---|---|---|---|
| 3,385,465 | 5/1968 | Bliss | 220—23.4 |
| 3,397,805 | 8/1968 | Berend | 220—23.86 |

OTHER REFERENCES

Hardware Age, Jan. 1, 1967, page 47, Design L.

CASMIR A. NUNBERG, Primary Examiner

U.S. Cl. X.R.

312—285